United States Patent [19]
Porter, Jr.

[11] 3,760,139
[45] Sept. 18, 1973

[54] METHOD AND MEANS FOR ACOUSTIC ENERGY CONVERSION

[76] Inventor: Don B. Porter, Jr., P. O. Box 115, Neodesha, Kans. 66757

[22] Filed: May 27, 1971

[21] Appl. No.: 147,347

[52] U.S. Cl............ 219/10.65, 219/10.51, 219/284, 310/2, 310/11
[51] Int. Cl......................... H05b 9/00, H02k 45/00
[58] Field of Search...................... 219/10.51, 10.65, 219/284, 375, 376; 310/2, 9.1, 11

[56] References Cited
UNITED STATES PATENTS

| | | | |
|---|---|---|---|
| 2,088,604 | 8/1937 | Littlefield | 219/10.65 X |
| 2,764,741 | 9/1956 | Banta | 310/11 X |
| 3,495,104 | 2/1970 | Burgo et al. | 310/9.1 |

*Primary Examiner*—R. F. Staubly
*Attorney*—John H. Widdowson

[57] ABSTRACT

A method of converting acoustic energy to another form of energy establishes a magnetic field in an electrically conductive fluid medium. Acoustic energy is passed into the electrically conductive fluid medium and converted therein into another form of energy. A conversion device receives acoustical energy passed into an electrically conductive fluid medium which is under the influence of a magnetic field. The energy passed into the electrically conductive fluid medium causes electric currents in the fluid which are dissipated in the magnetic field and transformed to thermal energy which is dissipated by the device.

28 Claims, 12 Drawing Figures

PATENTED SEP 18 1973

INVENTOR
DON B. PORTER JR.
BY John H. Widdison
ATTORNEY

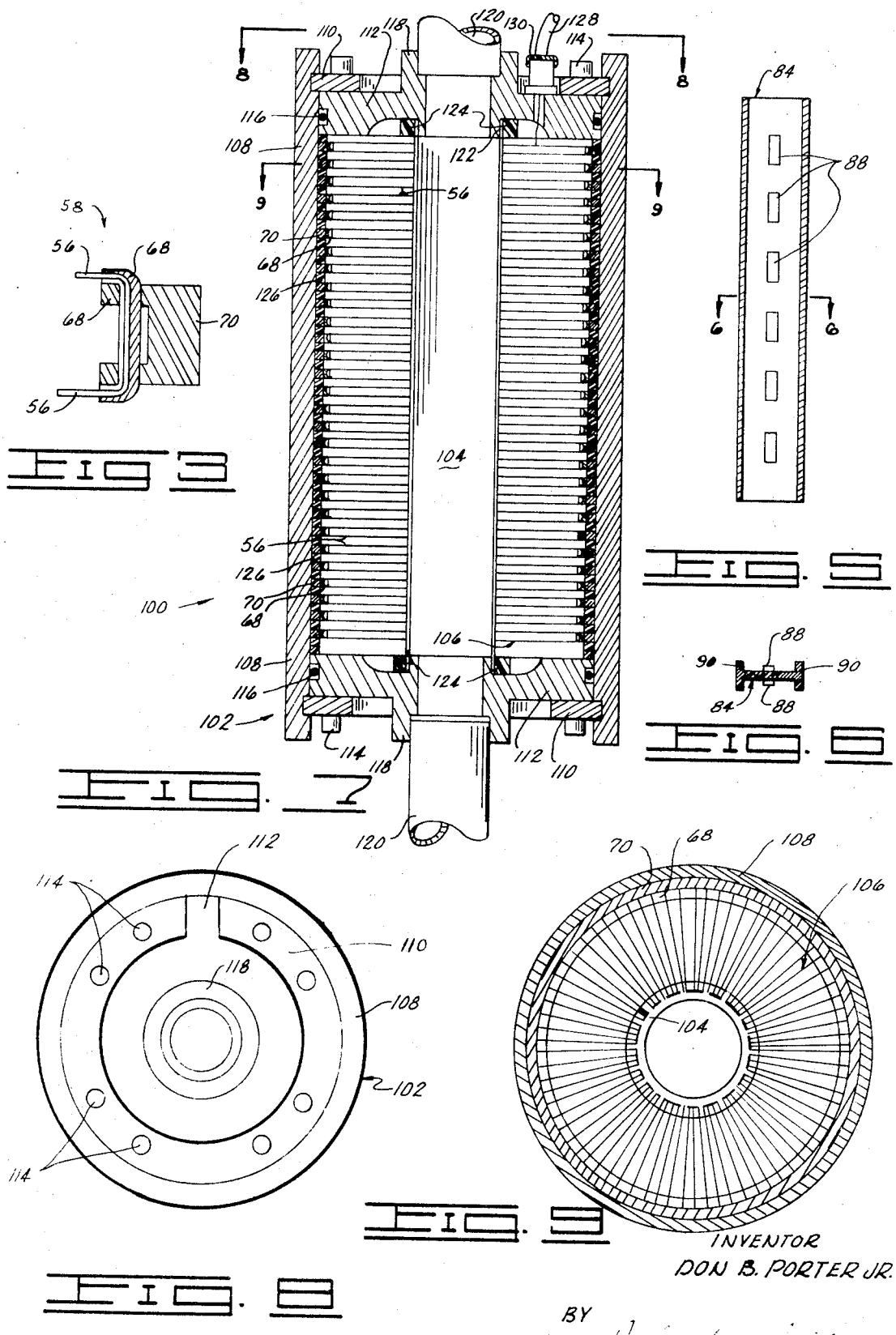

INVENTOR
DON B. PORTER JR.

BY
*John H. Widdowson*
ATTORNEY

METHOD AND MEANS FOR ACOUSTIC ENERGY CONVERSION

In the prior art of acoustic energy disipation and the art of thermal energy production no method or device is known that converts acoustic energy specifically into thermal energy.

In the herein disclosed invention a method and four preferred specific embodiments of a device to convert acoustic energy to thermal energy are provided. The energy conversion method generally includes the establishment of a magnetic field in a conductive fluid, passing acoustic energy into it and converting it to another form of energy and into thermal energy. The energy conversion device generally includes an electrically conductive fluid medium in an enclosure with a magnetic field to act on the fluid medium. A means is provided to produce acoustic energy in the fluid medium so it causes molecular, particle, motion in the fluid, and means are provided to transfer thermal energy from the energy conversion device.

In the herein described preferred specific embodiments of this invention the method of the invention is utilized in each of them. The method of conversion of energy of this invention is similarly employed in each of the hereafter described means of energy conversion and is an essential factor in their operation. The conversion method of this invention generally includes the establishing of a magnetic field in an electrically conductive fluid medium, passing acoustic energy into the fluid medium converting it into another form of energy and into thermal energy. The conversion method of this invention is generally adapted to the means of this invention and specifically adapted to the individual preferred specific embodiments of means of this invention as will be apparent from the hereafter description.

In one preferred specific embodiment of this invention a structureborne acoustic energy conversion device, (1), is provided for the direct transmission of structurally borne acoustic energy into thermal energy. A foundation mount mountable on a fixed surface has a cavity therein enclosing the fluid medium, and the magnetic field generator. A piston in the cavity in contact with the fluid provides transmission of acoustic energy to the fluid medium, and the outer surface of the foundation mount serves to disipate and radiate the converted thermal energy. The piston is secured to an acoustic energy generating structure or an acoustic energy generating device. Components of the device are constructed to be so impedance mismatched that acoustic energy received by the piston will be transmitted to the fluid medium and not to the structure of the device.

In a second preferred specific embodiment of this invention, an airborne acoustic energy conversion device, (2), is provided for the direct transmission of acoustic energy from air or other either gaseous fluid and/or liquid fluid into thermal energy. This device has an acoustically clear impedance envelope to be placed in the acoustic energy containing fluid that is adapted to pass the acoustic energy through it to the electrically conductive fluid medium inside the envelope. The magnetic field generator is contained in the envelope and acts in conjunction with the electrically conductive fluid to convert the acoustic energy to thermal energy. Thermal energy converted by this device is disipated by either radiation and/or conduction from the envelope.

In a third preferred specific embodiment of this invention a fluid-borne acoustic energy conversion device, (3), is provided for the direct transmission of acoustic energy from a fluid stream into the fluid medium for conversion into thermal energy. The enclosure has an acoustic fluid passageway therethrough with an acoustically clear membrane separating it and the fluid medium. The enclosure assembly confines the acoustic passageway and has the magnetic field generator in it. Acoustic energy passes through the membrane into the fluid medium and magnetic field where it is converted into thermal energy. The thermal energy is disipated from the housing by either radiation and/or conduction as it is converted.

In a fourth preferred specific embodiment of this invention a linear sonar array, (4), is provided to convert fluid borne acoustic energy into thermal energy and electrical signals from which sonar data may be taken. The linear sonar array is filled with the electrically conductive fluid, has a power line to establish the electromagnetic field in the conductive fluid medium. Pickup units are placed in the electricity conductive fluid to receive and detect acoustic energy as it passes by in the conductive fluid. The pickup units are used to detect electrical eddy-current activity in the fluid in the presence of the magnetic field. The linear sonar array also converts acoustical energy into thermal energy as do the other devices and it is coupled with detection and analysis equipment.

One object of this invention is to provide a method of converting acoustic energy into thermal energy.

Still, another object of this invention is to provide a method of converting acoustic energy into thermal energy whereby a magnetic field is established in an electrically conductive fluid medium and acoustic energy is passed into the fluid medium and therein converted to thermal energy.

Yet another object of this invention is to provide a method of converting acoustic energy to thermal energy wherein an electromotive force is established in a fluid medium and acoustic energy passing through the fluid medium is converted to thermal energy.

Yet an additional object of this invention is to provide a method of converting acoustic energy to thermal energy wherein the conversion can be detected for analysis.

One object of this invention is to provide an acoustic energy conversion device adapted to convert acoustic energy specifically into thermal energy.

Still, another object of this invention is to provide an acoustic energy conversion device to convert acoustic energy to thermal energy through the use of a magnetic field in an electrically conductive fluid medium by the dissipation of electrical eddy-current activity caused by molecular, particle motion in the conductive field.

Yet, another object of this invention is to provide an acoustic energy conversion device in a structural member to thermal energy in the fluid medium.

Yet, an additional object of this invention is to provide an acoustic energy conversion device to convert acoustic energy carried in a fluid stream to thermal energy in the fluid medium.

Yet another object of this invention is to provide an acoustic energy conversion device to convert acoustic energy carried in a fluid that is substantially unenclosed to thermal energy in a contained fluid medium.

Yet another object of this invention is to provide an acoustic energy conversion device to convert acoustic energy to thermal energy and to provide a conversion device to detect electrical eddy-current activity in the fluid medium so that sonar data can be taken.

Various other objects, advantages, and features of the invention will become apparent to those skilled in the art from the following discussion, taken in conjunction with the accompanying drawings, in which:

FIG. 3 is a view of the sensitizer filament holder and wall of the structureborne acoustic energy conversion device taken on line 3—3 of FIG. 2;

FIG. 5 is a cross-sectional view of the airborne acoustic energy conversion device showing a magnet supporting partition member;

FIG. 6 is a view of the airborne acoustic energy conversion device taken on line 6—6 of FIG. 5;

FIG. 7 is a cross-sectional elevation view of the fluidborne acoustic energy conversion device attached to a fluid conduit;

FIG. 8 is an end view of the fluidborne acoustic energy conversion device taken on line 8—8 of FIG. 7;

FIG. 9 is a cross-sectional view of the fluidborne acoustic energy conversion device taken on line 9—9 of FIG. 7;

Figures 1, 2, 4:
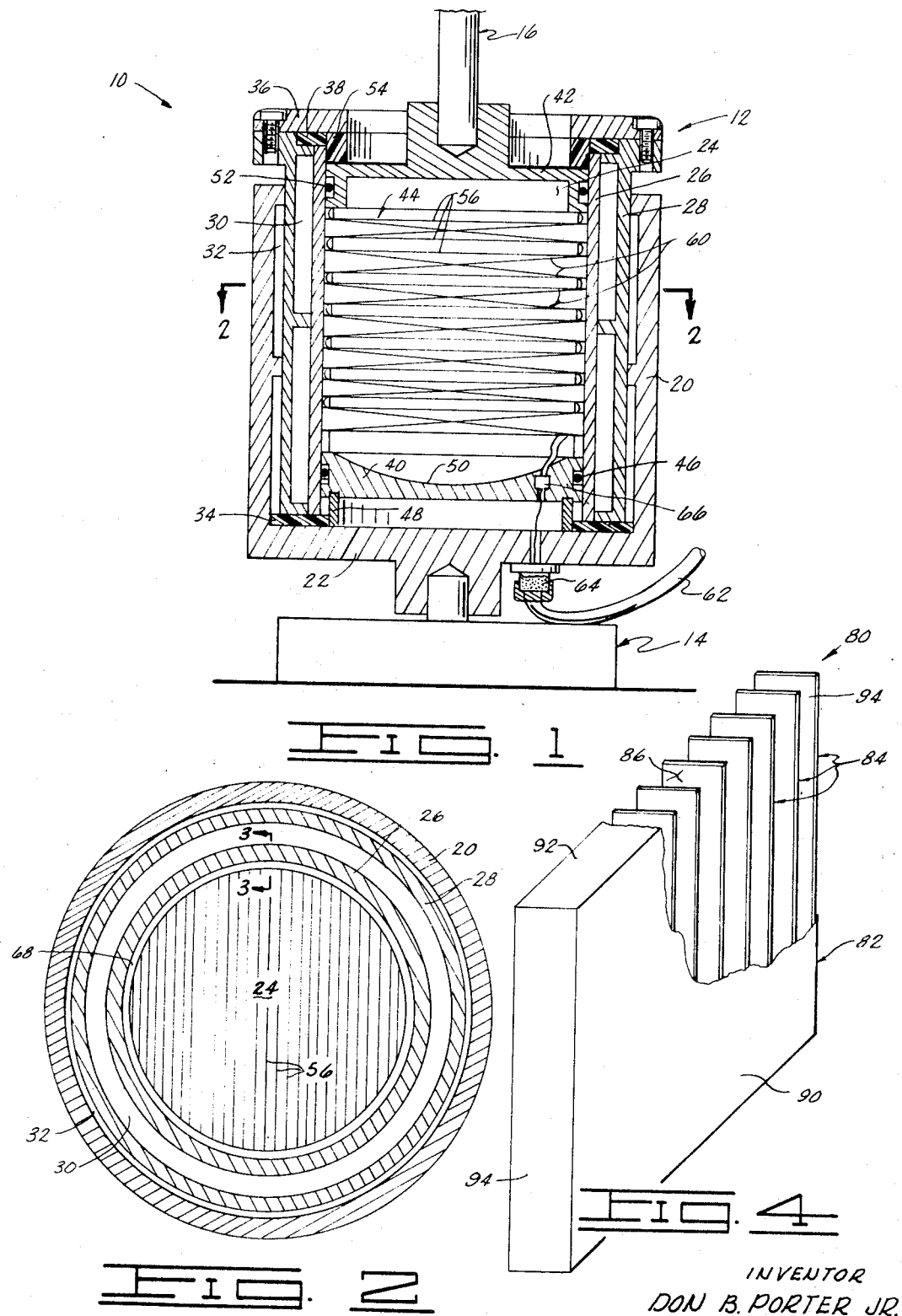
FIG. 1 is a cross-sectional side elevation view of the structureborne acoustic energy conversion device with an actuator and fixed mount.
FIG. 2 is a view of the structureborne acoustic energy conversion device taken on line 2—2 of FIG. 1.
FIG. 4 is a partially cut away perspective view of the airborne acoustic energy conversion device.

The following is a discussion and description of preferred specific embodiments of the method and means of acoustic energy conversion of this invention, such being made with reference to the drawings whereupon the same reference numerals are used to indicate the same or similar parts and/or structure. It is to be understood that such discussion and description is not to unduly limit the scope of the invention.

Precluding further reference to the drawings and discussion of the preferred specific embodiments and method of this invention, a general conceptual and technical example is provided describing the general operating principles of this invention. The following example is intended only to illustrate the basic principles on which the hereindescribed invention operates and is not to limit the scope of the invention.

First, the concepts involved with this invention can be logically and feasibly described in terms of general and known concepts. When acoustic energy is transmitted through a fluid media, motion of the fluid results. This motion is a result of particle or molecular disturbance of the fluid by the traveling energy waves. When an electrical conductor is moved through a magnetic field an electromotive force is generated or the potential of the particle is raised. By using an electrically conductive fluid media under the influence of a magnetic field and introducing acoustic energy into this fluid the result will be motion of the electrically conductive particles through the magnetic field thereby generating an electromotive force. Assuming the electrically conductive fluid to have homogeneous characteristics, then the electromotive force will result in eddy currents, circulating currents, which will be oriented by the direction of the magnetic field flux and by the direction of motion of the acoustical energy. As the acoustical energy wave passes through the fluid media in the influence of the magnetic field, its energy will be reduced as electromotive force and eddy currents are generated. The amount of acoustical wave energy reduction is proportional to the power of the electromotive force generated. While the eddy currents are circulating in the influence of the magnetic field, their energy will be dissipated and converted to thermal energy as they move in opposition to the flux of the magnetic field. Energy reduction of the eddy currents is facilitated by the potential of the charged particles being reduced by their motion against the force of the magnetic field, and by the electrical resistivity of the fluid media. The total result accomplished is that acoustic energy is introduced into a fluid media and therein converted to thermal energy.

Second, concepts relating to the herein described invention can be further demonstrated by the use of an example illustrating the energy redistribution which occurs in an acoustic wave in conjunction with the theoretical feasibility described in the foregoing. Consider an unbounded homogeneous fluid medium having a point source of acoustic energy located therein. When the point source of acoustic energy is activated to produce a single pulse of energy, a single spherical wave acoustic energy will travel from the point source. The thickness of the spherical wave traveling from the point source is one wave length and the spherical wave will travel at a velocity equal to the speed of sound in the fluid medium. As the spherical wave travels further from the point source, its volume necessarily increases and accordingly its energy content per unit volume is decreased though its total energy content may remain constant. This reduction of energy content per unit volume is known in sonar technology and is referred to as spreading loss. As the spherical wave increases in size, there is an energy velocity radially and since the enrgy content per unit volume is reduced there is necessarily an energy velocity tangential to the spherical wave or normal to the radial velocity. This energy redistribution occurs in the spherical wave as a result of these changing energy velocities due to the normal characteristic wave permutation. Also, any other thing which causes a change in the total energy content of the wave will necessarily cause an energy redistribution within the wave in addition to that described. All energy redistribution within the spherical wave must result in molecular or particle motion of the fluid in the direction of the energy redistribution. This molecular or particle motion is the motion which in an electrically conductive fluid, as described in the feasible and general description supra, will result in eddy currents and ultimately in acoustic to thermal energy conversion. Additionally, the physically different directions of motion of the energy velocities provides a basis for instrumentation and analysis of the acoustic wave.

Figure 12:
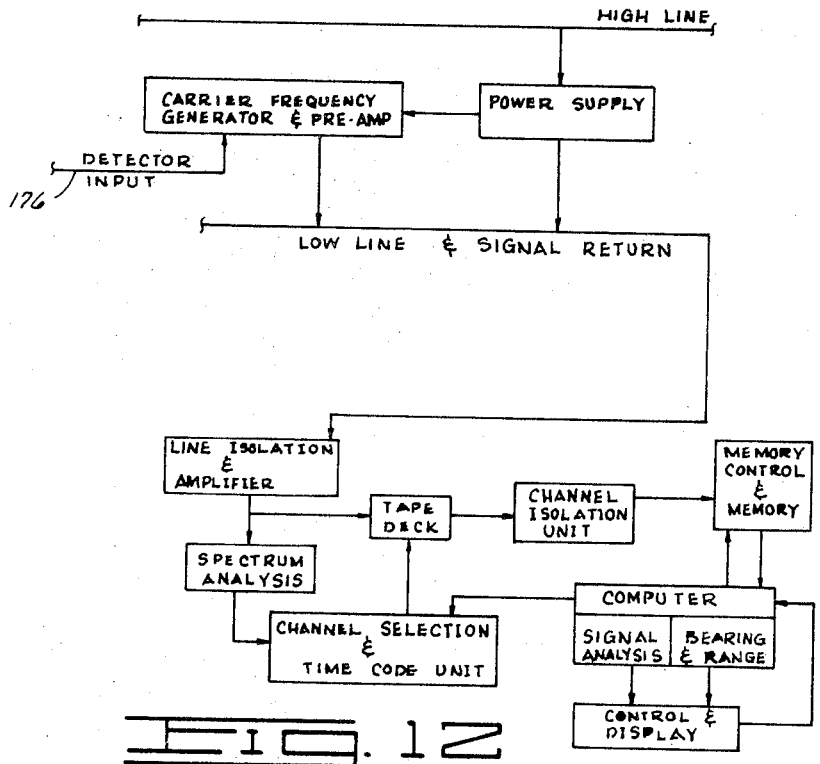
FIG. 12 is a block diagram of an arrangement of analytical equipment usable to take sonar data from the linear sonar array acoustic energy conversion device.
Figure 10:
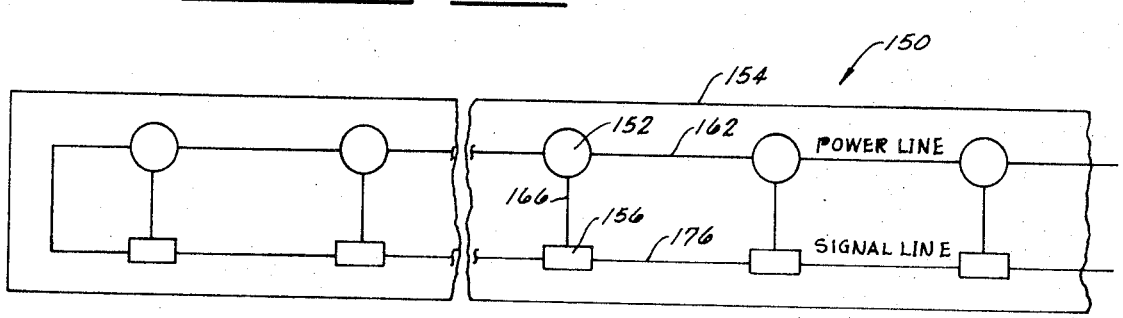
FIG. 10 is a diagrammatical view of the linear sonar array acoustical energy conversion device showing the enclosure, the pick up units and amplifiers.
Figure 11:
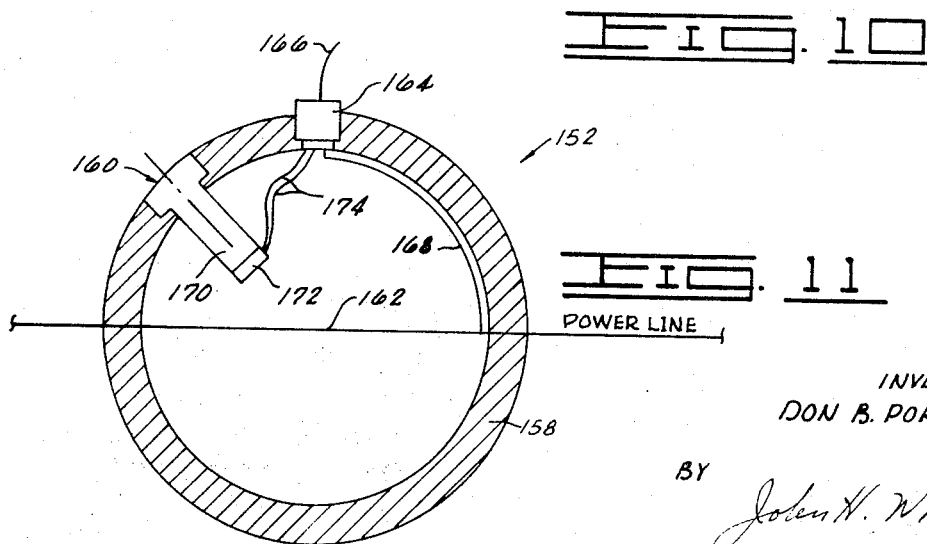
FIG. 11 is a cross-sectional view of a pick up unit of the linear sonar array acoustic energy conversion device.

Referring to the drawings in general FIGS. 1, 2 and 3 show the structureborne acoustic energy conversion device embodiment, (1), FIGS. 4, 5 and 6 show the airborne acoustic energy conversion device embodiment, (2), FIGS. 7, 8 and 9 show the fluidborne acoustic energy conversion device embodiment, (3), and FIGS. 10, 11 and 12 show the linear sonar array acoustic energy conversion device, (4), and diagrams of sonar data analysis equipment. All the herein described embodiments of this invention operate with the same method to convert acoustic energy to thermal energy, however, since the specific structure of each embodiment is different it will operate slightly differently and the method necessarily varies slightly with each conversion device as will be apparent in the following description which has incorporated therein a description of the method.

Referring to FIGS. 1, 2 and 3 of the structureborne acoustic energy conversion device, the device of this embodiment, (1), is generally indicated at 10 and includes a housing assembly 12 supported on a foundation mount 14, with an actuator member 16 to carry structurally borne acoustic energy to the device. The foundation mount 14 is preferably secured to a solid and substantially immovable surface or the like. The actuator member 16 is preferably a piece of structure of some device that carries acoustical energy, this could conceivably be a machine of same type or anything that structurally carries acoustical energy. The housing assembly 12 has a cylindrical outer member with a cylindrical sidewall 20 and integral bottom 22, the bottom 22 being securable to foundation mount 14. Inside the housing assembly a cylindrical cavity 24 is provided to contain the electrically conductive fluid medium; it has a cylindrical cavity wall 26. An isolation cylindrical wall 28 is spaced between the cavity wall 26 and the outer housing wall 20. It is to be noted these walls 20, 26 and 28 are separated by spaces 30 and 32 and held in parallel relation by inwardly extending supports on the inside of them. The cavity wall 26 and the isolation wall 28 on the bottom edges contact a resilient spacer 34 placed between them and the bottom of the housing 22. The isolation wall 28 on the top is secured to a cover 36 that is ring shaped and extends inward past the cavity wall 26 and isolated from the cavity wall 26 and the isolation wall 28 by a resilient member 38.

Inside the cavity 24 a reflector member 40 is positioned at the bottom isolated from the cavity wall 26 and the housing bottom 22; a transmitter piston 42 is positioned at the top of the cavity 24 isolated from the cavity wall 26 and cover 36; and a plurality of sensitizer elements, generally indicated at 44 are confined by the cavity wall 26. The reflector member 40 is sealed with the cavity wall by an O-ring 46 and supported above the housing bottom on a ring member 48. The upper surface 50 of the reflector member 40 is concaved outward from the cavity 24, and the reflector member is constructed of material that will reflect any acoustic energy striking the surface 50 back into the cavity 24. The transmitter piston 42 is sealed with the cavity wall 26 by an O-ring 52 and is isolated from the cover 36 by a resilient compression member 54. The resilient compression member 54 gives the piston 42 a nominal compression force against the fluid in the cavity and isolates it from the cover 36. On its outer surface the transmitter piston 42 is provided with a lug to attach the actuator member 16. The sensitizer elements 44 are a plurality of filaments 56 supported in a plurality of layers spaced through the cavity 24. The filaments 56 are parallel to one another and extend completely across the cavity 24 and are supported in guide ring assemblies 58 which are shown in detail in FIG. 3 spaced through the cavity. Each of the sensitizer elements 44 preferably has two layers of filaments—one below the other—supported in individual ring assemblies 58. The layers of sensitizer elements 44 are positioned so that they are all parallel and the filaments are parallel as can be seen in FIG. 1. The layers of sensitizer elements 44 are connected electrically by additional filaments 60 between them which are separate but appear to cross when seen as in FIG. 1. The sensitizer elements 44 are connected to an outside power source through a power line 62 attached to a coupler 64 on the housing bottom 22 and wires inside the housing passing through the reflector member 40 at a potted connector 66.

Details of the sensitizer elements mounts are shown in FIG. 3. The filaments 56 are mounted in an electrical insulating guide 68 that is circular in form having the filaments embedded in it. The guide 68 is attached to a band 70 on its outer perimeter. The band 70 is in direct contact with the cavity wall 26 and supports the guide 68. The guide 68 and band 70 are preferably constructed of an acoustically clear material so as not to impair acoustic energy transmission in the fluid medium.

In actual operation of the structureborne acoustic energy conversion device embodiment 10 of this invention, the device is mounted on a substantially solid foundation or the like, and the actuator member 16 is secured to a machine or another acoustic energy carrying device. The power line 62 is connected to a direct current electrical power source so the sensitizer elements 44 produce a magnetic field in the cavity 24. Acoustic energy is carried to the transmitter piston 42 through the actuator member 16. Acoustic energy carried in the actuator member 16 is best described, for purposes here, as energy waves which are in effect transferred directly into the transmitter piston. The transmittor piston 42 is designed to transmit the acoustic energy it receives to the fluid medium contained in the cavity 24. As acoustic energy is transmitted to the fluid medium, it causes motion of the molecular particles in the electrically conductive fluid medium in waves corresponding to the energy waves received from the actuator member 16. Since the molecular particles are actually electrically conductive particles and are moved through the cavity 24 as a result of their excitation by the transmitter piston, they generate an electromotive force as they move through the magnetic field. Assuming the fluid medium has essentially homogeneous characteristics of electrical conductivity, then the electromotive force will result in eddy currents, circulating electrical currents, oriented in the direction of the acoustic energy waves. The magnetic field is oriented so the lines of flux are oppositely oriented relative to the direction of travel of the acoustic energy waves. As the eddy currents move in the direction of the acoustic energy waves, they are opposed by the magnetic field and the energy of the eddy currents is dissipated into thermal energy. Thermal energy in the fluid medium is transferred through the fluid to the housing 12 where it is dissipated by conduction and radiation. Any acoustic energy not converted after passing through the cavity 24 is reflected by the reflector member 40 back through the cavity 24 to be acted on by the magnetic field.

It is to be noted that in the structure of this device the cavity wall 26, isolation wall 28 and housing side wall 20 are constructed to be so impedance mismatched thus acoustic energy will be contained within the fluid medium. Also, the reflector member 40 is impedance mismatched with the surrounding structure so it will reflect the acoustic energy waves which reach its surface 50. The transmitter piston 42 is impedance matched with the fluid medium so acoustic energy will be transferred from the piston 42 to the fluid medium will be maximized. The fluid medium may be either liquid or gas, either of which proves to be optimum. The important factor is that the transmitter piston is optimumly matched with the fluid medium regardless of the specific materials. The actual amount of acoustical energy converted to thermal energy will necessarily depend on several factors including the strength of the acoustic energy waves, the strength of the magnetic field and temperature.

In the optimization of all the herein described devices of this invention, several factors affecting physical properties of the materials in the devices are to be noted. First, the acoustical clarity of a material is dependent upon its relation to an ambient fluid in contact with it. A material is considered to be acoustically clear when it has the same sonic velocity as the ambient fluid in contact with it for purposes here. The advantage of an acoustically clear material is that sonic waves will travel through it at the same rate they would travel through the ambient fluid which is in contact with it. Second, the specific fluids necessary to optimize the device will depend upon several complex physical factors affecting the fluids, such as impedance match between the fluids, compressibility, mass density, electrical conductivity and bulk modulus. Two fluids will have an optimum impedance match when their (bulk modulus/density) ratios are equal. However, for each device the optimum impedance match will also require consideration of the geometric factors also. Maximizing eddy-current generation requires balancing the molecular amplitude and velocity; this is done by adjusting the bulk modulus of the fluid and/or density of the fluid. Maximum power loss is needed to maximize the acoustic to thermal energy conversion; this is done by adjusting the electrical conductivity of the fluid which depends on its molecular structure and ability to transport an electrical charge.

Referring to FIGS. 4, 5 and 6 of the drawings showing the airborne acoustic energy conversion device embodiment of this invention, this device is generally indicated at 80 and includes an envelope enclosure 82 with a plurality of enclosed sensitizer partitions 84 dividing the envelope enclosure 82 into a plurality of separate cavities 86.

The envelope enclosure 82 is constructed of an acoustically clear material adapted to pass acoustic energy yet retain an electrically conductive fluid medium within the enclosure between the sensitizer partitions 84. The sensitizer partitions 84 are rigid members constructed of acoustically clear material and have a plurality of magnets 88 mounted therein adapted to create the magnetic field. The magnets 88 are oriented with their north and south poles in the same direction so the magnetic field will be uniform in direction. The magnets are spaced on the sensitizer partitions 84 so as to create a magnetic field that is substantially uniform in strength.

The envelope enclosure 82 is preferably rectangular in shape as can be seen in FIG. 4. The sensitizer partitions 84 are parallel and extend the length of the envelope 82 so the cavities 86 are parallel and substantially equal in size. The envelope 82 has sidewalls 90 secured to the elongated edges of the partitions 84 and other sidewalls 92 secured across the ends of the sensitizer partitions 84. the remaining envelope sidewall 94 is the sensitizer partitions 84 on the end of the parallel plurality of them. The magnets 88 are preferably high magnetic field density permanent magnet type magnets and as can be seen in FIG. 6 secured to opposite sides of the sensitizer partition 84. It is obvious that the essential magnetic field of this device may also be provided by electromagnets energized by an external source.

The airborne acoustic energy conversion device 80 operates on the same theoretical principals as the aforedescribed structureborne acoustic energy conversion device 10. The airborne acoustic energy conversion device 80 is adapted to be supported in a medium of air or other gaseous fluid which is carying acoustic energy. For instance, an acoustic energy carrying gaseous fluid medium might be an engine exhaust, a furnace exhaust or the air in a room or other enclosure which has airborne acoustic energy. The airborne acoustic energy conversion device 80 can be supported in the gaseous fluid by mounts or the like, not shown, or supported in the medium by any suitable means.

Acoustic energy in the air or the like surrounding the airborne acoustic energy conversion device 80 for purposes here is assumed to be in energy wave form. The particular fluid medium enclosed in the envelope 82 is impedance matched with the air or gaseous fluid outside the envelope in order to insure transmission of the acoustic energy waves into the envelope 82. When an acoustic energy wave is transferred into the envelope 82, it causes molecular motion of electrically conductive fluid medium in the cavities 86. Motion of the particles in the electrically conductive fluid in the influence of the magnetic field created by the magnets 88 operates similar to that described above with the structureborne acoustic energy conversion device 10 and converts the acoustic energy into thermal energy. As thermal energy is created in the electrically conductive fluid medium by the conversion device 80, it is transferred to the walls 90, 92 and 94 of the envelope and dissipated from them to the surroundings. It is further noted that this device may be so constructed to accept acoustic energy from any source gaseous, liquid, or solid.

A third preferred specific embodiment of this invention is the fluidborne acoustic energy conversion device shown in FIGS. 7, 8 and 9 of the drawings. The fluidborne acoustic energy conversion device is generally indicated at 100 and includes a cylindrical housing 102 with an inner conduit 104 to pass fluid and sensitizer elements 106 around the inner conduit 104. The cylindrical housing 102 is an elongated barrel 108 with a split end cap retaining ring 110 secured in its ends holding end caps 112 in the end portions of the barrel 108. The split ring 110 is preferably held to the end caps 112 by bolts 114 to insure its proper placement. The end caps 112 have an O-ring seal 116 on their perimeter to seal them with the barrel 108 and they have a passageway through their center with an outer coupling 118 on the outside to join a fluid supply conduit 120 and an inner coupling 122 on the inside to join the inner conduit 104. The inner conduit 104 is an acoustically clear membrane used to separate the electrically condutive fluid and the acoustic energy carrying fluid. The membrane conduit 104 is held in a fluid tight seal with the inner end cap couplings 122 by compression rings 124.

The sensitizer elements 106 extend radially from the membrane conduit 104 to the inner wall of the barrel 108 as can be seen in FIGS. 7 and 9. The sensitizer elements 106 are preferably filaments supported at the barrel wall 108 similar to the band 70 and guide 68 support shown in FIG. 3 and described in detail with the structureborne acoustic energy conversion device 10 of this invention and have spacer members 126 between the bands 70. The sensitizer elements 106 are preferably supported at the membrane conduit 104 by looping through its outer portion a detail not explicitly shown in the drawings. The preferred radial positioning of the sensitizer elements 106 is shown in FIG. 9 with the filaments 56 looped through the membrane 104 to the depth of the dotted line. This construction allows for minimal obstruction of acoustic energy by the sensitizer elements 106. The sensitizer elements 106 are energized through a power line 128 connected to an electrical coupling 130 on an end cap 112 which is connected to the end filaments as shown in FIG. 7.

In order to optimize the conversion of acoustic energy of the fluidborne acoustic energy conversion device 100, the direct transmission of acoustic energy through the structure of the device is to be minimized. This optimization is to be done in several ways as described supra; other ways are by impedance mismatching the structural elements and the use of sound-isolating materials where practical. The end caps 112 are to be acoustically isolated from one another and from the barrel 108 to minimize the transmission of acoustic energy between them. The combined acoustic properties of the electrically conductive fluid and the conduit membrane 104 are adjusted for an impedance match with the supply fluid passing through the device in the conduit membrane. Matching properties of the supply fluid, membrane conduit 104 and the electrically conductive fluid cause a maximum amount of acoustic energy to be transmitted from the supply fluid to the electrically conductive fluid. Whether the selected fluids are liquid or gaseous depends on their acoustic properties and necessarily upon the supply fluid. Another factor affecting the efficiency of the fluidborne acoustic energy conversion device 10 is the sensitizer elements which are designed to produce a maximum electrical field strength and thereby cause a maximum power loss within the magnetic field it creates.

In operation the fluidborne acoustic energy conversion device 10 is connected in a fluid piping system by the fluid supply conduit 120. The fluid supply conduit 120 carries fluid containing acoustic energy and can enter the device from either end. The sensitizer elements 106 are energized through the power line 128 by a direct current power supply to establish a magnetic field in the electrically conductive fluid. The electrically conductive fluid is activated by the acoustic energy transmitted to it through the membrane conduit 104 and cause particle motion in it which generates electrical eddy currents. The electrical eddy currents are converted to thermal energy due to the power loss as they move in the electrically conductive fluid. Thermal energy of the electrically conductive fluid is dissipated from it through the housing 102 to the surroundings.

A fourth preferred specific embodiment of this invention is the linear sonar acoustic energy conversion device and associated apparatus which is shown in FIGS. 10, 11 and 12. The linear sonar acoustic energy conversion device is shown generally in FIG. 10, indicated at 150, and includes a plurality of pick-up units 152 in an enclosure 154 filled with an electrically conductive fluid. The pick-up units 152 are individually connected to preamplifiers 156 which are in turn connected to the detection and analysis equipment shown in FIG. 12. The linear sonar device 150 embodiment of this invention is to provide a means of analysis and detection of the acoustic energy conversion and provide a means of converting acoustic energy to thermal energy.

The enclosure 154 is preferably constructed of acoustically clear material to isolate all other elements of the linear sonar conversion device 150 from the surrounding fluid. The pick-up units 152 have a spherical shell 158 of acoustically clear material with a post-coil assembly 160 mounted therein extending into the inner cavity of the shell 158 and a power and signal conductor 162 extending through the shell 158. The pick-up units 152 can be constructed with more than one post-coil assembly therein, but for description purposes here only one is shown. The pick-up units 152 contain the electrically conductive fluid sealed inside the shell 158. A shell mounted connector 164 serves to connect the power line 162 and the detector coil to the preamplifier units 156 via an electrical cable 166. It is to be noted that where several signals are to be transmitted as here, they can be multiplexed and sent on a single line instead of multiple lines. The power line 162 is preferably a straight wire positioned through the center of the shell 158 and has another wire 168 connecting it to the connector 164. The post-coil assembly 160 is a post 170 of acoustically clear material extending radially into the shell 158 with a detector coil 172 mounted on its inner end and connected by leads 174 to the connector 164. The detector coil 172 can function to detect electrical eddy-current activity in the electrically conductive fluid in the presence of the electromagnetic field generated by the power line 162. Where the pick-up unit has a plurality of detector coils, they can be used to analyze wave motion and other characteristics of the device requiring cooperating detectors. Signals from the detector coils 172 are amplified by the separate preamplifiers 156 connected to each pick-up unit 152, then the signal goes by a signal line 176, as the signal detector input to the apparatus shown diagrammatically in FIG. 12.

In order to optimize the conversion of energy by this device, the acoustical properties of the electrically conductive fluid, the shell 158, the conductive fluid medium around the pick-up units 152 and the material of the enclosure 154 must be matched so a maximum of acoustic energy is transmitted to the electrically conductive fluid inside the shell 158. The materials of the enclosure 154 and the shell 158 are necessarily substantially acoustically clear to pass a maximum of energy. The preamplifiers 156 shown in the enclosure are necessarily shielded so as not to interfere with the acoustic energy transmissions or electromagnetic field. the specific fluids used in this device will necessarily depend on the fluid surrounding the enclosure and the other factors as described supra.

In operation of the linear sonar acoustic energy conversion device 150 of this invention, the electromagnetic field is generated by the power line 162 and the enclosure 154 with the fluid medium in it passes acoustic energy to the pick-up units 152. The enclosure 154 can be placed in a fluid medium so as to receive acoustic energy from some source. Since the pick-up units and the enclosure are designed to pass acoustic energy, the acoustic energy around the enclosures 154 is passed through them to the pick-up units 152.

Acoustic energy passing through the pick-up unit shells causes molecular particle motion of the electrically conductive fluid in the shell; this in turn generates electrical eddy currents as described supra. The electrical eddy currents are dissipated in the electrically conductive fluid due to its omic resistance and are converted to thermal energy.

The block diagram shown in FIG. 12 includes sufficient elements believed to be necessary for analyzing sonar data that can be taken from the pick-up units in the linear sonar acoustic energy conversion device. The analytical equipment indicated is designed to receive data from several pick-up units 152 and store the data separately then retrieve any portion of it for analysis later. It is to be understood these analytical elements are presented as an illustration of a technique usable to analyze sonar data obtainable from the acoustic energy conversion devices of this invention.

The block diagram of FIG. 12 shows an arrangement of equipment which is typically used in the analysis of sonar data. The function of the elements shown in the block diagram and their function are briefly described in the following. The carrier frequency generator and preamplifier imposes a different carrier frequency on the separate inputs received from the detector coils 172. The power supply furnishes the proper operating powers and voltages for the equipment. It is to be noted the preamplifiers 156 and other amplifiers are necessarily properly mis-matched to prevent cross talk between them. The line isolation and amplifier element boosts the input signal strength and protects against short circuits in the input signals. The tape deck element records all signals for permanent storage so they can be used later as desired. The spectrum analysis element analyzes the input signal without the carrier frequency for characteristics such as strength, harmonics and other appropriate characteristics. The channel selection and time code unit element generates a time code signal transmitted to the tape deck element to be used for sequencing and indexing the data. The channel isolation unit element is used to isolate the input signal from any specific pick-up unit 152 and transmit that signal to the memory control and memory element. The memory control and memory element is the data storage unit of the computer and stores data for use by it. The computer analyzes data stored in the memory control and memory unit to determine and evaluate the signals for properties of acoustic reflection, absorption, etc. The control and display element is linked to the computer to control it and to display the calculated resultant data for observation and interpretation.

In the use and operation of the acoustic energy conversion device of this invention and the preferred specific embodiments of it disclosed herein, it is seen that same provides a device to convert acoustical energy to thermal energy. The preferred specific embodiments of the conversion device provide means to convert acoustical energy to thermal energy whether the acoustical energy is carried to the device in a structural member or in a fluid. Additionally, the acoustic energy conversion device provides a device which can be used to generate, detect and analyze sonar information as illustrated in the linear sonar conversion device embodiment.

As will be apparent from the foregoing description of the applicant's acoustic energy conversion device, relatively simple means have been provided to convert acoustical energy into thermal energy. The conversion devices are relatively simple in construction and are adapted to convert acoustic energy that is transmitted in structural members and in fluids to thermal energy. The preferred specific embodiments of the conversion devices are simple to use and can be used in a wide variety of applications to reduce the acoustic energy content of a fluid or a structure by converting it to thermal energy and for analysis of sonar characteristics and data.

While the invention has been deseribed in conjunction with preferred specific embodiments thereof, it will be understood that this description is intended to illustrate and not to limit the scope of the invention, which is defined by the following claims.

I claim:

1. A method of converting acoustic energy to other forms of energy, comprising:
   a. establishing a magnetic field in an electrically conductive fluid medium,
   b. passing acoustic energy from a source of same into said fluid medium having acoustic energy waves being opposed in movement by forces of said magnetic field, and
   c. therein converting said acoustic energy first into electrical energy and second into thermal energy.

2. The method of claim 1, wherein, said magnetic field is established or generated from within said fluid medium.

3. The method of claim 1, wherein:
   a. said magnetic field is established or generated primarily within an appropriate electrically conductive fluid medium,
   b. said acoustic energy is generated mechanically or naturally, and
   c. said thermal energy is passed as such from said fluid medium.

4. The method of claim 3, wherein:
   a. said acoustic energy is transmitted to said fluid medium by mechanical means,
   b. said fluid medium is mechanically isolated so as to receive substantially all said acoustic energy,
   c. said energy is generated in said fluid medium, and
   d. said thermal energy is passed from said fluid medium by conduction, convection, radiation, or any combination thereof.

5. The method of claim 4, wherein:
   a. said fluid medium is ionized for optimum electrical conductivity,
   b. the bulk modulus and specific weight of said fluid are adjusted for maximum conversion of acoustic energy, and
   c. said fluid is an organic or inorganic liquid.

6. The method of claim 3, wherein:

a. said acoustic energy is established in a second fluid medium,
b. said acoustic energy is transmitted to said first fluid medium by said second fluid medium,
c. said thermal energy is generated in said first fluid medium, and
d. said thermal energy is transferred from said first fluid medium by conduction, convection, radiation or any combination thereof.

7. The method of claim 6, wherein:
a. said first fluid medium is ionized for optimum electrical conductivity,
b. the bulk modulus and specific weight of said first fluid are adjusted optimumized for maximum conversion of acoustic energy,
c. said first fluid is organic or inorganic, and
d. said second fluid medium is a conductor of acoustic energy.

8. The method of claim 7 wherein, said second fluid medium is a liquid.

9. The method of claim 7, wherein, said second fluid medium is a gas.

10. The method of claim 3, wherein:
a. said acoustic energy is established in a second fluid medium,
b. said second fluid medium surrounds said first fluid medium,
c. said acoustic energy is transmitted to said first fluid medium through said second fluid medium, and
d. said thermal energy is generated in said first fluid medium and transferred from same said first fluid medium to said second fluid medium.

11. The method of claim 10, wherein:
a. said first fluid medium is ionized for optimum electrical conductivity,
b. the bulk modulus and specific weight of said first fluid are adjusted for maximum conversion of acoustic energy,
c. said first fluid is organic or inorganic, and
d. said second fluid medium is a conductor of acoustic energy.

12. The method of claim 11, wherein, said second fluid medium is a liquid.

13. The method of claim 11, wherein, said second fluid medium is a gas.

14. The method of claim 3, wherein:
a. said acoustic energy is established in a second fluid medium,
b. said acoustic energy is transferred from said second fluid medium to said first fluid medium,
c. said acoustic energy is converted to electrical energy in said first fluid medium,
d. said electrical energy is converted to thermal energy in said first fluid medium,
e. said thermal energy is transferred to said second fluid medium by conduction, convection, radiation, or any combination thereof, and
f. said other form of energy is detectable in said first fluid medium for purposes of analysis.

15. The method of claim 14, wherein:
a. said first fluid medium is ionized for optimum electrical conductivity,
b. the bulk modulus and specific weight of said first fluid are adjusted for maximum conversion of acoustic energy,
c. said first fluid is an organic or inorganic fluid, and
d. said second fluid is fresh water, or seawater, or any combination thereof.

16. An acoustic energy conversion device, comprising:
a. an electrically conductive fluid medium,
b. a magnetic field producing means to produce a magnetic field acting on said electrically conductive fluid medium,
c. a source of acoustic energy, and
d. means to receive acoustic energy from said source of same and pass said energy into said fluid medium to produce acoustical energy source waves in a direction of travel oppositely orientated relative to lines of flux of said magnetic field producing means,
said acoustic energy conversion device adapted to convert acoustic energy into thermal energy by introducing acoustic energy into said electrically conductive fluid medium under the influence of a magnetic field.

17. The device of claim 16, wherein:
a. said electrically conductive fluid medium is enclosed in a container,
b. said source of acoustic energy generates sonic waves to be introduced into said device,
c. said device has a diaphragm to receive sonic waves mounted in appropriate relation to said container to pass said sonic waves into said electrically conductive fluid medium,
d. said magnetic field acts through a portion of said fluid medium,
e. said foundation mount means is secured to a substantially immovable surface and has a cylindrical enclosure with one closed end and has said transmitter member mounted at the other end thereof,
f. said cavity is cylindrical and has said plurality of filament members mounted at the inner wall of said cavity extending transversely thereacross in one direction, with said transmitter member at one end of said cavity and said reflector surface at the opposite end of said cavity,
g. said means to acoustically isolate said transmitter member from said foundation mount means is a second wall in contact with and between said cavity wall and said foundation mount means sidewall constructed to be an impedance mismatch between said transmitter member and said foundation mount means,
h. said transmitter member is a piston movably mounted within said cylindrical cavity wall in one end portion thereof,
i. said reflector surface is a concavely curved surface mounted within said cylindrical cavity wall at one end thereof constructed to be acoustically reflective in order to reflect acoustic energy that reaches that end of said cavity back toward said transmitter piston at the opposite end of said cylindrical cavity, and
j. said plurality of filament members are parallel to one another secured to an electrically insulated and acoustically clear mount at said cavity wall connected to one another arranged in a plurality of transverse layers spced longitudinally through said cavity, and connected to an external direct current power source.

18. The device of claim 16, wherein:
a. said electrically conductive fluid is a readily electrically excitable fluid, b. said magnetic field producing means is adapted to produce said magnetic field generally homogeneously, c. said means to transfer acoustic energy to said fluid medium is an acoustically permeable to container adapted to contain said fluid medium, d. said source of acoustic energy to generate said sonic waves to pass through said container, and e. said means to transfer thermal energy from said fluid medium is a portion of said container having a high coefficient of heat transfer.

19. The deivce of claim 16, wherein:

a. said means to receive acoustic energy and pass same is an acoustically permeable container, b. said container has a cavity to contain said electrically conductive fluid medium, c. said magnetic field producing means has a filament within said cavity to carry an electrical current and thereby produce said magnetic field, d. said acoustically permeable container has a transmitting member in contact with said electrically conductive fluid medium to transmit acoustic energy into said electrically conductive fluid medium, e. said container means has a foundation mount means to support said device and means to acoustically isolate said transmitter member from said foundation mount means, f. said magnetic field producing means has a plurality of said filaments within said cavity, g. said transmitter member is rigidly mounted with a structural member to transmit acoustical energy to said transmitter member; and h. said means to receive acoustic energy has a reflector surface in said cavity in contact with said electrically conductive fluid medium to receive a portion of the transmitted acoustic energy from said transmitting member after it passes through said fluid medium and reflect same back through said electrically conductive fluid medium.

20. The deivce of claim 16, wherein:

a. said means to receive acoustic energy and pass same is an acoustically permeable container, b. said container has a cavity to contain said electrically conductive fluid medium, c. said magnetic field producing means has a filament in said cavity to carry electrical current and produce said magnetic field, d. said means to receive acoustic energy is an acoustically permeable membrane in contact with said electrically conductive fluid medium and a second fluid in contact with said membrane, e. said source of acoustic energy is said second fluid, and f. said means to transfer thermal energy from said fluid medium is said container.

21. The deivce of claim 20, wherein:

a. said container means has an elongated walled housing with said membrane cylindrically shaped and mounted centrally in said elongated housing forming said cavity to contain said electrically conductive fluid between said membrane and said housing wall, b. said elongated housing has end caps mounted in the end portions thereof and mounted with said membrane adapted to attach a conduit to pass said second fluid through said acoustically permeable membrane, c. said end caps are mounted with said elongated housing so as to be acoustically isolated from said membrane and acoustically isolated from said housing wall, and d. a plurality of said filament members are secured to said elongated housing wall by an acoustically clear mount and are connected together and to an external electrical power source.

22. The device of claim 21 wherein:

a. said filament members are mounted with said membrane and extend radially therefrom to said acoustically clear mount at said housing wall, b. said filament members are arranged in a plurality of layers spaced along and transverse to said elongated housing, and c. said end caps are mounted on the inside of said housing wall with a seal therearound to close and seal said cavity.

23. The device of claim 16, wherein:

a. said means to receive acoustic energy and pass same is an acoustically permeable container, b. said container means has a cavity to contain said electrically conductive fluid medium, c. said magnetic field producing means has a permanent magnet mounted with said container means to produce said magnetic field, d. said acoustic energy receiving means is an acoustically permeable membarne forming the outer portion of said container to separate said electrically conductive fluid medium in said cavity from a second fluid medium surrounding said container and adapted to pass acoustical energy from said second fluid medium to said electrically conductive fluid medium, and e. said source of acoustic energy is through said second fluid medium.

24. The device of claim 23, wherein:

a. said container has a plurality of said cavities therein separated by a plurality of acoustically permeable partitions, b. said paratitions have a plurality of said permanent magnets secured thereto to produce said magnetic field, and c. said partiions are attached to said membrane so as to be acoustically isolated from same and said magnets are attached to said partitions so as to be acoustically isolated from said partitions.

25. The devcie of claim 24, wherein:

a. said container has an elongated rectangular shape with said cavities elongated, b. said membrane is integrally attached to and covers said partitions and forms the outer covering of said container contactable with said second fluid medium, c. said plurality of partitions are similar to one another and parallely mounted in said container means to said cavities are similar to size and shape, and have said magnets mounted therealong the elongated axis of said partitions, and d. said electrically conductive fluid medium and said second fluid medium are gaseous fluid mediums.

26. The device of claim 24, wherein:

a. said means to receive acoustic energy and pass same is an acoustically permeable container, b. said container has a cavity to contain said electrically conductive fluid medium, c. said magnetic field producing means has a wire conductor passing through said cavity to produce said magnetic field,
d. said acoustic energy receiving means is an acoustically permeable and spherically shaped membrane enclosing said cavity to separate said electrically conductive fluid medium inside said cavity means from a second fluid medium surounding said spherical membrane,
e. said container means has a closed envelope means containing said second fluid medium and said spherically shaped membrane adapted to pass acoustic energy from the surrounding into said second fluid medium, and
f. said source of acoustical energy is through said second fluid medium.

27. The device of claim 26, wherein:

a. said wire conductor passes through a major axis of said spherically shaped membrane,
b. said envelope means has a plurality of said spherical membranes contained therein,
c. said spherical membrane has a detector coil mounted therein to detect electrical currents, so as to be usable by sonar analysis equipment, and
d. said means to transfer thermal energy is said envelope means.

28. The device of claim 27, wherein:

a. said plurality of spherical membranes have the same said wire conductor passing through them to generate said magnetic field, and
b. said detector coil is mounted in proper relation to said wire conductor to receive electrical energy from it through the electrically conductive fluid.

* * * * *

UNITED STATES PATENT OFFICE
CERTIFICATE OF CORRECTION

Patent No. 3,760,139　　　　Dated September 18, 1973

Inventor(s) Don B. Porter, Jr.

It is certified that error appears in the above-identified patent and that said Letters Patent are hereby corrected as shown below:

Column 2, line 56, "field" should read -- fluid --.

Column 4, line 46, "enrgy" should read -- energy --. Column 9, line 3, "condutive" should read -- conductive --. Column 10, line 67, "the" should read -- The --. Claim 15, paragraph c, "fluid, second occurrence, should read -- liquid --. Claim 17, paragraph j. line 5, "spced" should read -- spaced --. Claim 18, paragraph c, line 2, cancel "to". Claim 19, line 1, "deivce" should read -- device --. Claim 21, line 1, "deivce" should read -- device --. Claim 23, paragraph d, line 2, "membarne" should read -- membrane --; Claim 24, paragraph b, line 1, "paratitions" should read -- partitions --. Claim 25, line 1, "devcie" should read -- device --. Claim 24, paragraph c, line 1, "partiions" should read -- partitions --.

Signed and sealed this 27th day of August 1974.

(SEAL)
Attest:

McCOY M. GIBSON, JR.　　　　C. MARSHALL DANN
Attesting Officer　　　　　　Commissioner of Patents